(No Model.) 3 Sheets—Sheet 2.
J. MAXWELL.
MACHINE FOR MAKING NUTS.
No. 345,795. Patented July 20, 1886.
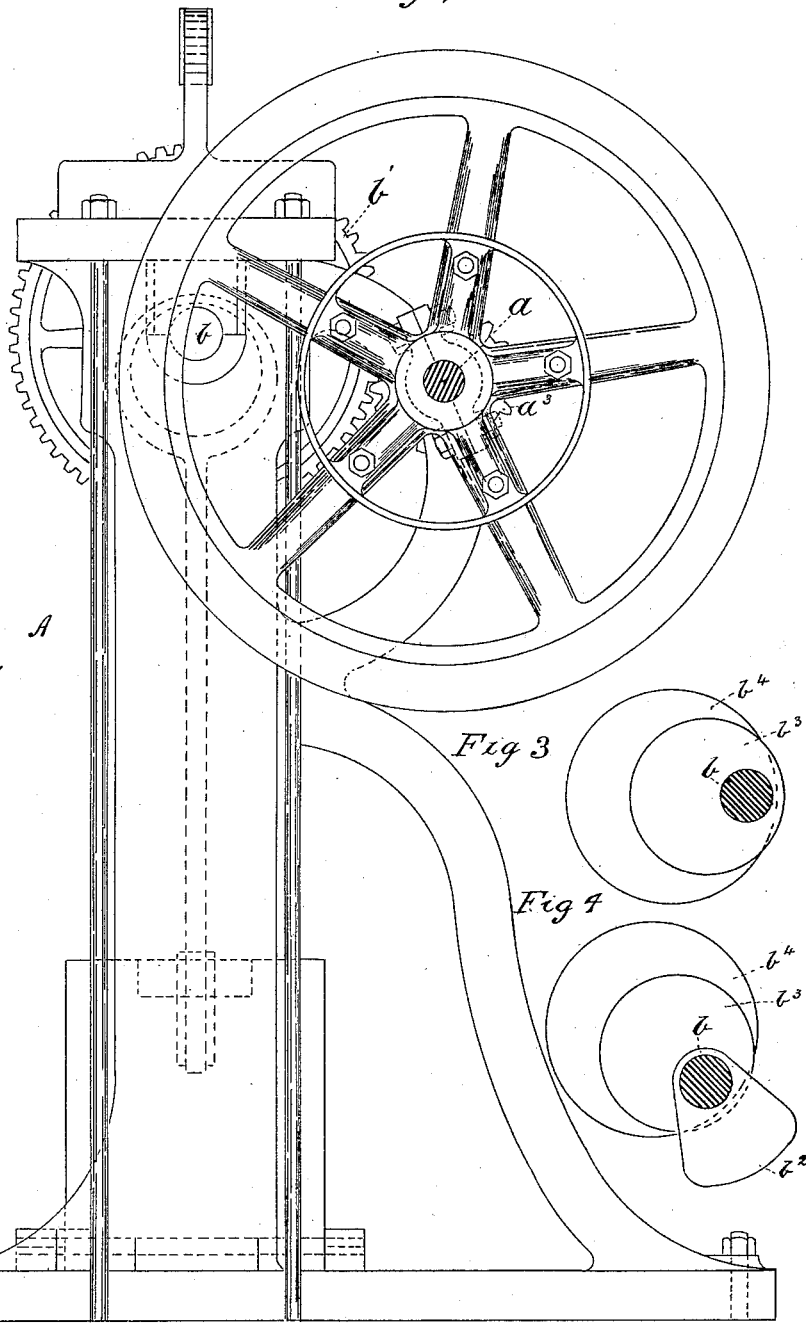
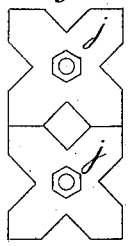
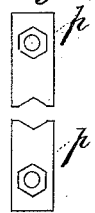
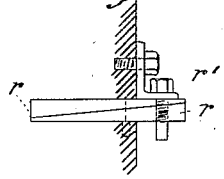
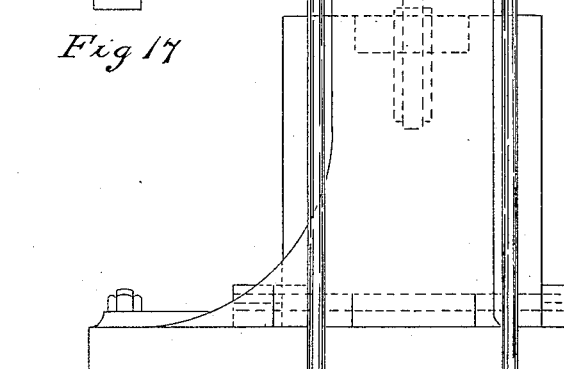
WITNESSES:
P. W. Smith
F. I. Willsea
INVENTOR
John Maxwell
BY O'Brien & Co.
his ATTORNEYS
N. PETERS. Photo-Lithographer, Washington, D. C.

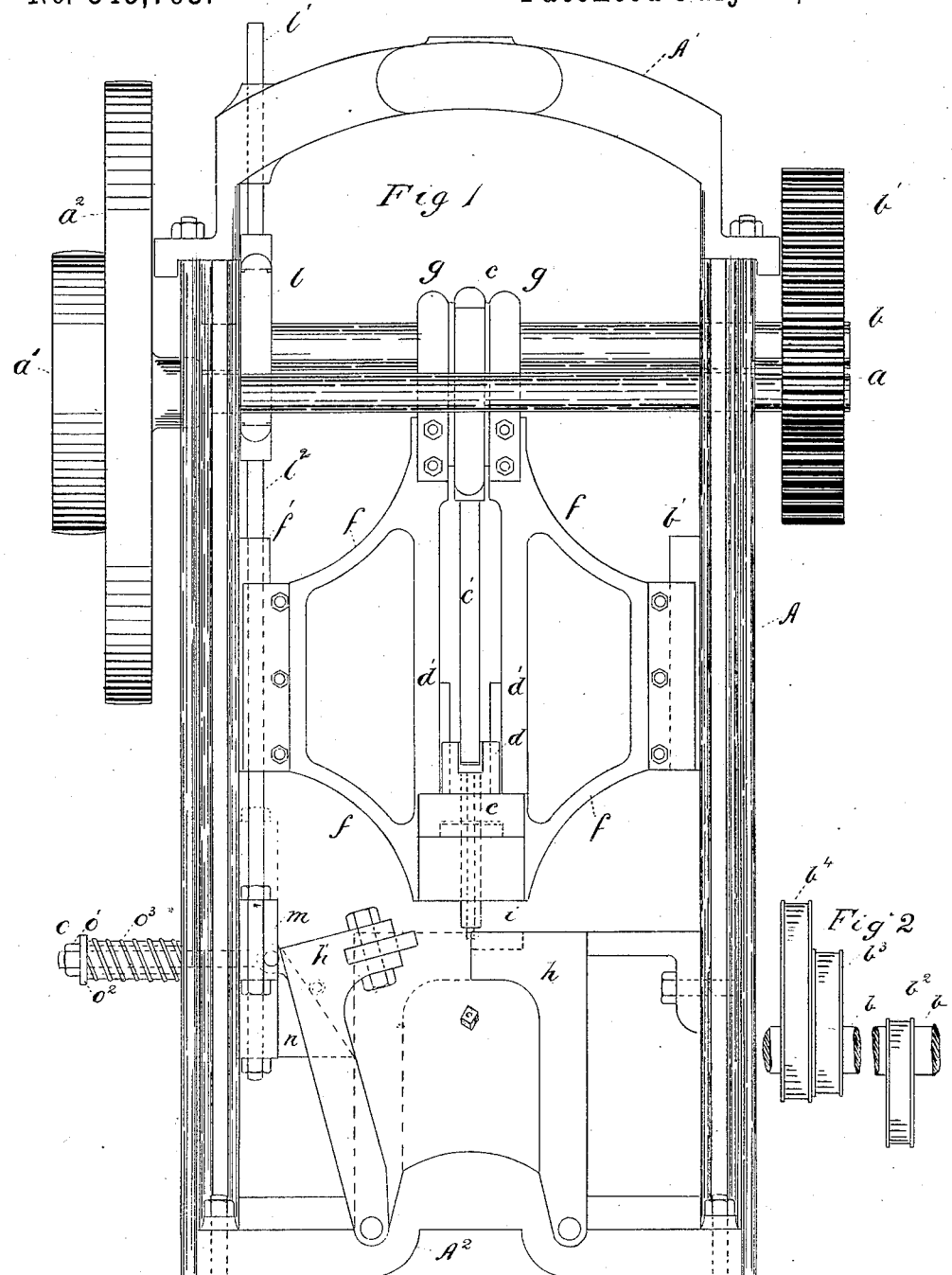

(No Model.)  3 Sheets—Sheet 3.

J. MAXWELL.
MACHINE FOR MAKING NUTS.

No. 345,795.  Patented July 20, 1886.

WITNESSES:
P. W. Smith
F. I. Willsea

INVENTOR
John Maxwell
BY O'Brien & Co.
his ATTORNEYS

N. PETERS, Photo-Lithographer, Washington, D.C.

UNITED STATES PATENT OFFICE.

JOHN MAXWELL, OF DENVER, COLORADO.

MACHINE FOR MAKING NUTS.

SPECIFICATION forming part of Letters Patent No. 345,795, dated July 20, 1886.

Application filed March 15, 1886. Serial No. 195,314. (No model.)

*To all whom it may concern:*

Be it known that I, JOHN MAXWELL, a citizen of the United States, residing at Denver, in the county of Arapahoe and State of Colorado, have invented a certain new and useful Improvement in Machines for Forging Nuts, of which the following is a specification, reference being had therein to the accompanying drawings, in which similar letters refer to corresponding parts.

My invention relates to improvements in nut-forging machines; and the object of my improvements is to provide an upright machine with a short stroke, but powerful leverage, said leverage being acquired by the use of cams attached to a main propelling-shaft, as hereinafter more fully described.

Figure 9:
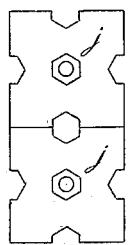
Figure 12:
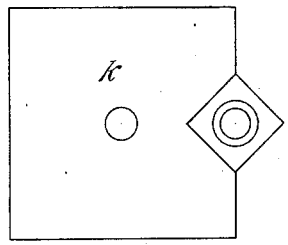
Figure 14:
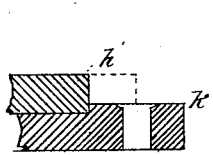
Figure 13:
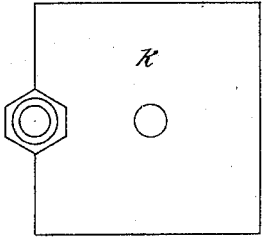
Figure 10:
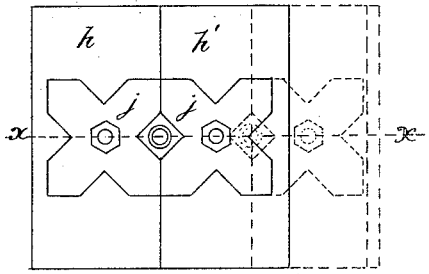
Figure 11:
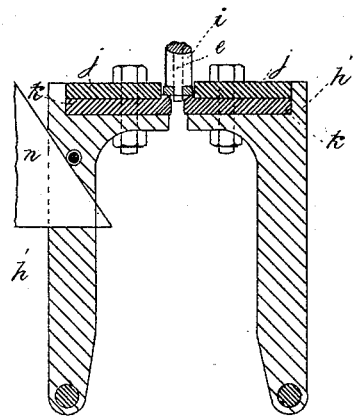

In the drawings, Figure 1 is a front elevation of the entire machine. Figs. 2, 3, 4, 5, and 6 show the cams and their relative positions upon the main shaft. Fig. 7 is a side elevation of the machine. Figs. 8 and 9 show the side dies for both square and hexagonal nuts. Fig. 10 is a top view of the die-blocks with the dies attached. Fig. 11 is a vertical section of the die-block and the attachments, taken on the line $xx$, Fig. 10. Figs. 12 and 13 are plan views of the crown-dies for both square and hexagonal nuts. Fig. 14 is a vertical section of the crown-die cut through the center. Fig. 15 is a plan view of the shapers. Fig. 16 is a side view, and Fig. 17 a plan view, of the wedges by means of which the main punch is adjusted.

In the drawings, A is an R-shaped upright frame composed of two sides connected at the top by the arch A' and at the bottom by the base-block $A^2$.

Figure 6:
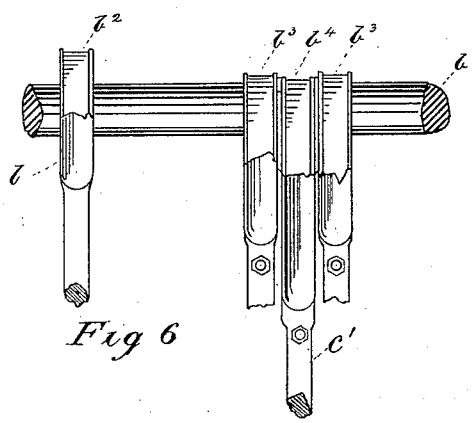
Figure 5:
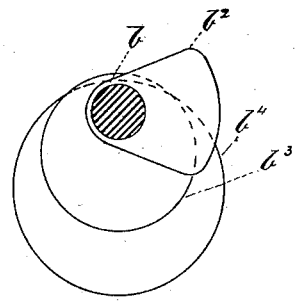

$a$ and $b$ are shafts journaled within frame A. Shaft $a$ contains pulley-wheel $a'$, fly-wheel $a^2$, and small gear-wheel $a^3$. To shaft $b$ is attached the larger gear-wheel, $b'$, also the cams $b^2, b^3,$ and $b^4$. All these cams are stationary upon shaft $b$ and turn with it. Their shape and relative position upon the shaft are shown in Figs. 2, 3, 4, 5, and 6. Cams $b^3$ are exactly alike. Cam $b^4$ is placed in the center of shaft $b$, a cam, $b^3$, being placed upon each side, as shown in Fig. 6. Around cam $b^4$ is a metal strap, $c$, which is bolted beneath the cam to an arm, $c'$, as shown in Fig. 6. Strap $c$ is broken away in Fig. 6 for the purpose of showing the cam. Arm $c'$ is attached to a movable block, $d$, at its lower extremity by means of a bolt, said arm being allowed a slight lateral movement upon said bolt. To movable block $d$ is also attached piercing-punch $e$. Block $d$ has grooves in its sides, within which run the guides $d'$, as shown in Fig. 1.

$f$ is a movable ram containing grooves in sides for the reception of suitable guides, $f'$, attached to the sides of frame A, as shown. To the upper portion of ram $f$ is bolted clasps $g$, which pass over cams $b^3$, being bolted to the ram upon both sides. Ram $f$ gets its movement from cams $b^3$ as shaft $b$ revolves. To the lower central portion of ram $f$ is securely attached main punch $i$, through the center of which the piercing-punch $e$ passes. Below the ram $f$, between the sides of the frame A and resting upon base-block $A^2$, are the die-blocks $h$ and $h'$. To the top of the die-blocks are bolted the side dies, $j$, as shown in Fig. 10, said dies being received within suitable sockets, equal in depth to the thickness of the dies formed in the top of the blocks. Underneath the side die, $j$, in block $h'$, is placed the crown-die $k$, (shown in Figs. 12 and 13,) for square and hexagonal nuts, respectively.

Fig. 14 is a vertical section cut through the center of side die, $h'$, and the crown-die, thus showing the depression in the crown-die, which shapes or "crowns" the under surface of the nut. Die-block $h$ is pivoted at its base to base block $A^2$, so as to allow said die-block to move backward, as shown in Fig. 1, and return to its original position. This movement of block $h'$ is accomplished by the mechanism hereinafter described. Cam $b^2$ works within yoke $l$, which entirely surrounds said cam. This yoke is broken away in Fig. 6 for the purpose of showing the cam. To the top of yoke $l$ is attached guide $l'$, as shown in Fig. 1. To the bottom of said yoke, and directly opposite guide $l'$, is attached the rod $l^2$, which extends downward through slide $m$, to which it is securely bolted. To slide $m$ is attached wedge $n$, which is partially shown by dotted lines in Fig. 1. Wedge $n$ moves within a slot formed for the purpose in die-block $h'$, its movement being facilitated by a small roller. (Shown by dotted lines.) The purpose of wedge $n$ is to close die-block $h'$ as rod $l^2$ is raised by the action of cam $b^2$, revolving with shaft $b$. To die-block $h'$, by means of a socket-joint, is attached the rod $o$ with the nut $o'$ and washer $o^2$. Surrounding rod $o$, between washer $o^2$ and the frame of the machine, is the spiral spring $o^3$, which contracts as die-block $h'$ is closed by the upward movement of wedge $n$, and as said wedge descends the expansion of spring $o^3$ opens die-block $h'$ to the position shown in Fig. 1. The closed position of die-block $h'$ is shown in Fig. 11 and by dotted lines, Fig. 1.

In Fig. 15 is shown a pair of shapers, $p$. These shapers are attached to the top of the die-blocks and parallel with the side dies, being placed on the side of the machine from which the iron is fed for forging. These shapers are of the same thickness as the plate of iron from which the nuts are forged, and rest upon the top of the die-blocks. They are only used in forging hexagonal nuts.

In Figs. 16 and 17 are shown a pair of wedges, $r$, by means of which main punch $i$ is adjusted. These wedges are placed within an opening in the lower portion of ram $f$, formed for the purpose, the lower surface of the bottom wedge being in contact with the upper extremity of punch $i$. Wedges $r$ are slotted, as shown in Fig. 17, for the reception of piercing-punch $e$, which passes through them. Wedges $r$ are held in position by set-screw $r'$, which may be loosened and the wedges driven inward, for the purpose of forcing punch $i$ downward, should the punch become so worn as to render such action necessary.

In the operation of my improved machine power is applied to shaft $a$ by means of a belt attached to pulley $a'$, which sets shaft $b$ in motion, the gear-wheel $a^3$ meshing with gear-wheel $b'$.

In describing the operation of the machine we will begin with the die-block $h'$ open, as shown in Fig. 1, the cams and punches occupying the relative positions shown in Fig. 2. The iron (heated to the proper temperature) from which the nuts are to be forged is first placed in position over the dies and directly beneath the punches. When shaft $b$ has made a half-revolution or about a half-revolution, the cams are in the position shown in Fig. 6, the action of cam $b^2$ within its yoke having raised rod $l^2$, with its attachments, thus closing block $h'$, as shown in Fig. 11 and by dotted lines in Fig. 1. At the same time cams $b^3$ force ram $f$, with main punch $i$, downward, cam $b^4$ acting simultaneously upon piercing-punch $e$ till said punches occupy the position shown in Fig. 11, the nut being forced downward upon the crown-die, which having done its work, die-block $h$ opens, and punches $i$ and $e$ are raised as shaft $b$, with its cams, continues to revolve, and the formed nut drops beneath the die-blocks, as shown in Fig. 1.

This machine forms both hexagonal and square nuts. I have just described the formation of a square nut. In forging hexagonal nuts I use the shapers shown in Fig. 15. In this case the main punch $i$ must of course be hexagonal, and the hexagonal side and crown dies must be used.

In the formation of hexagonal nuts, as die-block $h'$ closes shapers $p$ clasp the iron (properly heated) and approach each other until they occupy the position shown in Fig. 15. As die-block $h'$ opens again, the part of the iron acted upon by the shapers in the manner just described is moved to the proper position over the dies and beneath the punches, after which the process is the same as in the formation of square nuts. During the formation of one hexagonal nut by the punches and dies the shapers are preparing another for their action. The shapers used in the forging of hexagonal nuts are placed close to the side dies on that side of the die-blocks where the iron from which the nuts are to be forged is fed. The object of the shapers is to form four sides of the hexagonal nut preparatory to subjecting the iron to the action of the dies and punches. The advantage gained by using the shapers is that they avoid a waste of material in the formation of hexagonal nuts. As I use the shapers at the present time, they are employed in shaping one nut while the punches and dies are finishing another adjacent nut on the same bar of metal. I do not, however, confine myself to this use of the shapers, as they may be placed immediately above and in contact with the side dies, the machine thus shaping and punching the nut without changing the position of the bar of metal.

Though my improved machine is especially designed for forging nuts hot or cold pressed, it is obvious that by slight variations in the mechanism it may be used for a variety of other similar purposes—as stamping, cutting, punching, or pressing iron, other metals or materials. This may be accomplished by changing the punches and dies to correspond with the form of the article to be forged, stamped, punched, or pressed. These changes ordinary mechanical skill will suggest.

What I claim as my invention, and desire to secure by Letters Patent, is—

1. In a machine for forging nuts, the combination of a suitable upright frame, shaft $b$, provided with cams $b^3$ and $b^4$, suitable yokes for said cams, arm $c'$, ram $f$, movable block $d$, piercing-punch $e$, main punch $i$, and die-blocks $h$ and $h'$, provided with suitable side and crown dies, substantially as described.

2. A machine for forging nuts, provided with die-blocks $h$ and $h'$, side dies, $j$, crown-die $k$, shaft $b$, provided with cam $b^2$, and suitable attachments for opening and closing die-block $h'$ by the action of said cam, in combination with suitable punches, substantially as described, and for the purpose set forth.

JOHN MAXWELL.

In presence of—
B. W. SMITH,
G. M. ALLEN.